United States Patent [19]
Tafoya

[11] Patent Number: 5,317,166
[45] Date of Patent: May 31, 1994

[54] A SYSTEM FOR DECODING BAR CODED LABELS UPON DIFFERENT SIZE CONTAINERS

[75] Inventor: Benny R. Tafoya, Doylestown, Pa.

[73] Assignee: PSC Inc., Webster, N.Y.

[21] Appl. No.: 21,055

[22] Filed: Feb. 23, 1993

[51] Int. Cl.$^5$ .............................................. G06K 7/10
[52] U.S. Cl. ..................................... 250/568; 235/467
[58] Field of Search ................ 250/568, 566, 234–236, 250/223 R; 235/467, 463, 470

[56] References Cited
U.S. PATENT DOCUMENTS

| | | | |
|---|---|---|---|
| 4,047,023 | 9/1977 | Key et al. ............................ | 250/568 |
| 4,057,784 | 11/1977 | Tafoya ................................ | 250/568 |
| 4,136,821 | 1/1979 | Sugiura et al. ...................... | 250/568 |
| 4,418,276 | 11/1983 | Yatsunami .......................... | 235/467 |
| 4,798,943 | 1/1989 | Cherry ................................ | 235/466 |
| 4,877,949 | 10/1989 | Danielson et al. ................... | 235/462 |
| 4,916,318 | 4/1990 | Iima ................................... | 250/568 |
| 5,177,343 | 1/1993 | Takenaka ........................... | 235/467 |
| 5,216,230 | 6/1993 | Nakazawa .......................... | 235/467 |

FOREIGN PATENT DOCUMENTS

| | | | |
|---|---|---|---|
| 0036950 | 10/1981 | European Pat. Off. ............ | 250/568 |
| 0011939 | 1/1977 | Japan ................................. | 250/568 |
| 0041585 | 2/1991 | Japan ................................. | 235/467 |

Primary Examiner—David C. Nelms
Attorney, Agent, or Firm—Rene A. Kuypers; Joseph F. Murphy

[57] ABSTRACT

A system apparatus for altering the depth of field of a lens mechanism for use with a bar code. The altering of the mechanism allows different focal points and increased depths of field to be selected to accommodate different container sizes. The system is also designed to provide a variable threshold which adjusts the receiving circuitry based upon the amplitude of the signal received from the scanned label. Additionally, the system may be operated in a mode which introduces alternate threshold switching for allowing labels of low contrast bar and space elements to be successfully scanned along with elements of high contrast. Incorporated into the apparatus is a technique for adjusting the circuitry when there is a reduction of the power output of the beam generating laser.

28 Claims, 2 Drawing Sheets

A SYSTEM FOR DECODING BAR CODED LABELS UPON DIFFERENT SIZE CONTAINERS

BACKGROUND OF THE INVENTION

From the above discussion it is understood that if the optical apparatus is designed to accommodate a bar coded container of one size for scanning purposes, it will have difficulty in accurately scanning a labeled container of a different size if it is outside the depth of field. Accordingly, the instant invention has been designed to double the depth of field of conventional prior art apparatus by providing a lens system that will produce two focal points and two depths of field. This doubling of the depth of field allows labels on different size containers to be scanned which increases the versatility of the system.

The present invention also overcomes the problem of adjusting the electronic circuitry for the strength of the reflected signal that is received after a symbol has been scanned. As understood in the art, the larger the container the larger the reflected signal from the label with respect to the optics of the system; and the smaller the container the smaller the signal from the label with respect to the optics. The apparatus presently disclosed is able to adjust the receiving circuitry based upon the strength of the reflected signal.

Another shortcoming of the prior art that has been solved by the present invention is the ability to read low contrast bar code labels that may be printed by the trade, and to make adjustments to the system when the output of the beam generating source is decreasing over time.

SUMMARY OF THE INVENTION

The present invention has been provided to overcome certain deficiencies of the prior art which have had difficulties in scanning bar coded labels when placed upon cartons of different dimensions, and which are carried by a relatively high speed conveyor belt past a bar code scanning location. The invention relates to an apparatus which is designed to automatically increase the depth of field of an optical system associated with a laser light source. This is accomplished by moving a converging lens with respect to a diverging lens associated with a coherent light source. This lens mechanism which is referred to as autofocus enables same size bar code labels located on either large or small container sizes to be scanned with a high percentage success rate.

Another aspect of the invention provides a technique for re-setting the threshold points of the electronic circuitry based upon the amplitude of reflected signals that are received after the bar coded container has been scanned. It is apparent that in the event that a large coded container is being scanned by a closely positioned scan beam, the reflected signal from the label provides large amplitude excursions, whereas a label of the same size on a small container will produce only a lower amplitude reflected signal due to its distance away from the beam generator. The dual threshold techniques of the invention automatically adjusts collected light which is based upon the proximity of the bar coded label to the scanner's optics.

The present invention also provides apparatus that will enable low contrast as well as high contrast bar coded labels to be decoded by circuitry that utilizes alternating threshold switching. The switching of the threshold level is applied for each generation of a scan cycle initiated by a rotating multi-faceted polygon. When a low contrast label is encountered, the alternating high and low thresholds applied to the reflected analog signal assures that the scanned label will be successfully decoded by the circuitry. This is assured because of the high repetition rate of the facets of the polygon with respect to the container movement.

A technique is also provided in this invention to enable the apparatus to adjust the circuitry by a proportional amount with respect to the diminution of the power output of the laser scanning beam.

It is therefore an object of the invention to provide a new and improved apparatus for scanning bar code labels on containers of various sizes.

It is also an object of the invention to successfully decode low contrast bar code labels, and to adjust the circuitry when there is a loss of power by the beam generating source.

DESCRIPTION OF THE PREFERRED EMBODIMENT

Figure 1:
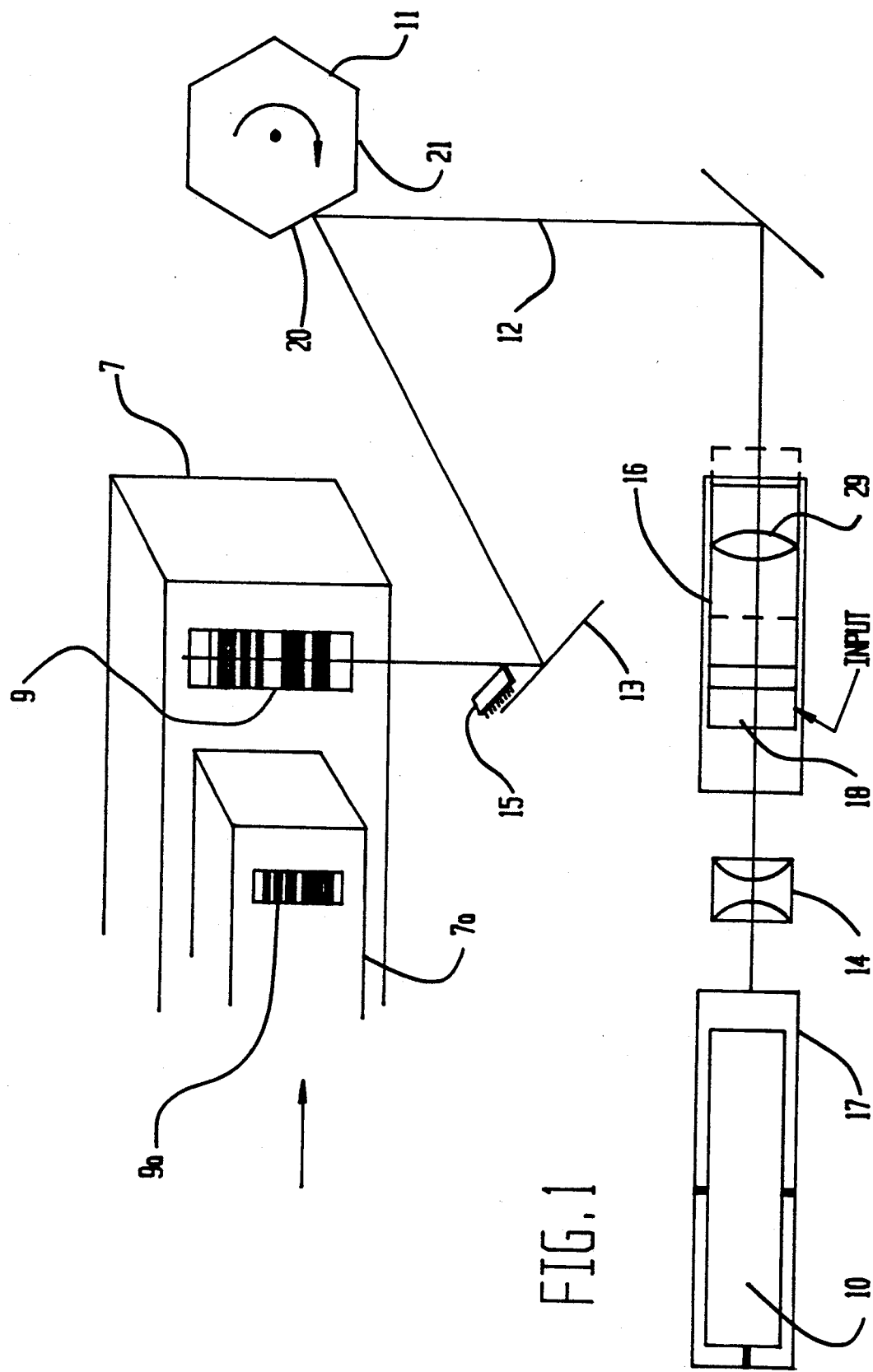
FIG. 1 is a representation of the dual threshold apparatus of the invention.

Referring now to FIG. 1 of the drawings, a bar code apparatus in schematic form is shown to illustrate the automatic focus technique of the invention.

The apparatus provides in a preferred embodiment a helium-neon laser device 10, which generates a coherent light source resulting in a narrow beam of light. The light beam travels along the beam axis 12 and is directed into a first lens element 14 which is negative or a diverging type. The negative lens 14 is used to expand the beam as it exits and prior to entering a second lens 16 located in a telescope tube 16. The second lens 29 is a positive or convex lens and is utilized to converge the beam of light as it is received from lens 14. The telescope tube 16, which holds the lens 29, is attached to a solenoid 18, and when there is no input signal the tube remains in a forward or normal position. For purposes of description the normal position of telescope 16 is shown in FIG. 1 with a dotted outline. In the non-energized state, a spring (not shown) associated with the solenoid 18 maintains the tube 16 outside its frame 17 where it is conditioned to read containers which are deemed to be large.

When the solenoid 18 is activated by a required input signal it causes the telescopic tube 16 and the lens 29 to move leftwardly as viewed in the drawing and as indicated by the solid outline of the unit. As the beam continues on its axis 12 after exiting from the tube 16, it continues on a folded optical path for scanning a bar coded label 9 located upon an outside surface of a container 7. A second smaller container 7a is depicted in order to contrast different sizes of units that can be successively scanned by the apparatus disclosed with the same bar code label. The folded path travelled by the beam along axis 12 is shown by striking obliquely positioned mirror 13 and a facet 20 of the rotating polygon 11. As a result, the beam 12 is applied to label 9, 9a of respective containers 7, 7a for purposes of scanning the coded information contained therein. A photo detector 15 is located in proximity to mirror 13 for purposes that will become clear hereinafter.

The apparatus of FIG. 1 is utilized to provided two focal points for the beam of light 12 emanating out of the laser generating device 10. A particular focal point is selected based upon either container 7, 7a whose size is detected prior to the bar code label being scanned by the beam of light. If a label on a container being scanned falls within the near field or far field of a focal point, all labels on the container within the field will be successfully decoded. A successful scan and decode requires that the beam is sufficiently narrow or focused that it can distinguish between the bars and spaces of a particular label.

On the other hand, if the container being scanned falls in a more distant range of sizes as determined by a photo-eye the solenoid 18 is activated, which causes the positive lens within the telescope tube 16 to be moved to the position indicated by the solid outline of FIG. 1. The new focal point that is obtained by the movement of tube 16 produces a different depth of field from the previously described focal point and associated depth of field. This lens movement enables a label associated with a small sized container 7a to be successfully read.

The above described operation may be summarized as follows: the depth of field associated with each focal point is twenty (20) inches. When both depths of field are added to one another the result is forty (40) inches. Therefore, the ability to change the focal point of the present invention has doubled the scanner's depth of field thereby allowing containers 7, 7a which are within different size ranges to be successfully scanned.

Figure 2:
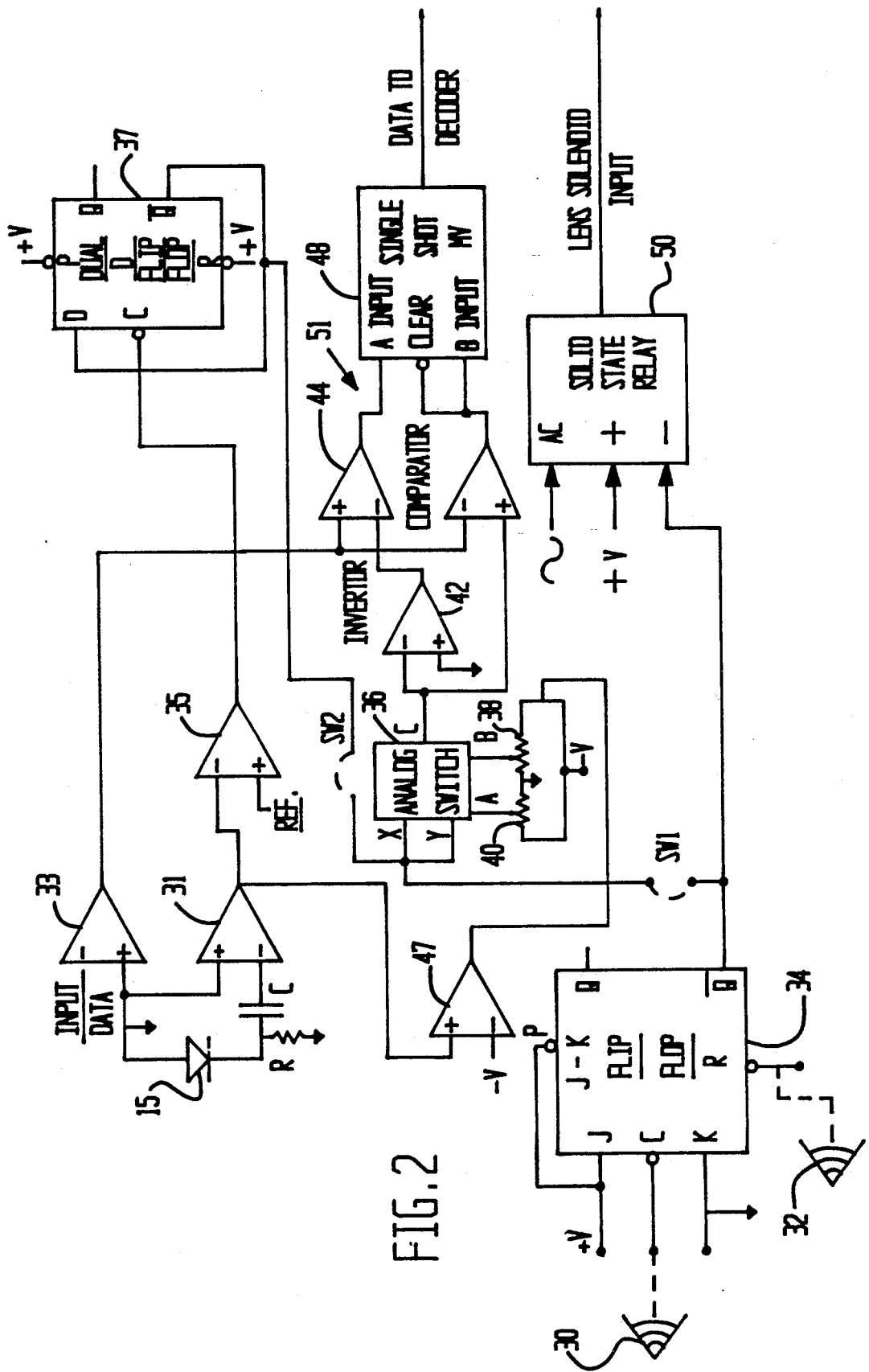
FIG. 2 is a block diagram of the electronic circuitry utilized with the apparatus of FIG. 1.

The automatic focusing of the above described optical system may be accomplished by electronic circuitry as shown in FIG. 2 of the drawings. Let it be assumed that a container bearing a coded label is being carried on a conveyor belt (not shown) at a relatively high speed and past the scanner apparatus of FIG. 1; and, let it be further assumed that the container 7a being scanned is within the smaller size range. As the container whose coded label is being scanned passes photo-eyes 30,32 it causes a blocking of photo-eye 30, but not photo-eye 32 in view of its small size.

The momentary blockage of photo-eye 30 causes a negative or low pulse (L) to be generated which is applied to the clock input (C) of the J-K flip-flop 34. A positive voltage and ground signals are respectively applied to the J and K inputs of the flip-flop. Since the photo-eye 32 is not blocked by the particular container carried by the conveyor, the signal applied to the re-set terminal (R) remains high (H). The small circle applied to the input terminals indicates that a negative transition clock signal is required to enable the flip-flop 34. The setting or latching of flip-flop 34 causes the outputs Q and $\overline{Q}$ to become H and L, respectively.

The L voltage from $\overline{Q}$ is applied to the negative terminal of a solid state relay 50 as one of its input signals; a second input to the positive terminal of relay 50 is a positive or H signal and the third input is an AC signal. Since all three signals are present at the input terminals of relay 50 and two are of the proper polarity it is activated so that the AC signal appears at its output. The AC signal present at the relay output terminal is applied to the solenoid 18 through its input terminals. The activation of the solenoid 18 causes the telescope tube 16 to be pulled back within the frame 17. In other words, the positive lens within the tube 18 is brought closer to the fixed negative lens 14. Therefore, since the label 9a positioned upon the small container 7a being scanned is deemed to be at a long distance from the scanner's optics, the system is automatically adjusted with a required focal point and depth of field. This automatic adjustment will enable bar code labels on small containers of various sizes to be successively scanned as long as they fall within the depth of field.

When a large container 7 carrying a bar coded label 9 is to be scanned, the photo-eye 32 will be blocked thereby generating a negative transition which is applied to the R terminal of the flip-flop 34. It should be noted that in actual practice the photo-eye 32 is positioned slightly ahead of photo-eye 30 in a conveyor belt environment. Therefore, the flip-flop 34 will be re-set by the L signal applied to terminal R and, the generation of a negative or L signal transition by photo-eye 30 to terminal C will have no effect on flip-flop 34. Therefore, flip-flop 34 will remain in a re-set condition and output terminals Q and $\overline{Q}$ will be at L and H levels, respectively. The H signal applied to the negative terminal of relay 50 will not activate this component and there will be no AC output signal produced. Since the solenoid 18 will not be activated the telescopic tube 16 will be maintained in a forward position by a spring device (not shown) as illustrated in dotted form in FIG. 1. As a result of this movement another focal point is created by the apparatus disclosed so that large containers may be readily and accurately scanned.

The output signal from the J-K flip-flop 34 is simultaneously applied to an analog switch 36 when switch SW1 is closed. Hence, when a symbol on a small container is being scanned a L signal from the flip-flop 34 is applied to the inputs X,Y of the analog switch 36. The L signal applied to inputs X,Y causes the threshold signal from variable resistor 40 at input A to be applied to output terminal C. The input of A is transferred to the output of C by circuit action of the switch 36. This output signal is applied to the positive input of operational amplifier 46 and, to the negative terminal of operational amplifier 44 after passing through an operational amplifier 42; this amplifier has unity gain and operates as an invertor 42. Amplifier 44, 46 are connected to one another as a differential amplifier or comparator 50. The data input or reflected signal, which is in analog form, received from the scanned coded label is differentiated (not shown) prior to being applied to the positive and negative input terminal of respective amplifiers 44, 46. Since the amplitude of the differentiated signal due to the reflected signal from small container 7a is low, the threshold signal applied to comparator 50 through switch 36 appropriately clips the signal at a low level to recover the required data. As a result of the clipping action, the width of the resulting signal allows narrow bars and spaces or wide bars and spaces to be detected for eventual transfer to a decoder (not shown).

The outputs of comparator 50 comprising amplifiers 44, 46 are respectively directed into the input terminals A, B and C of the single-shot multivibrator 48. The C input is a clear input terminal to the single-shot 48 and together with input B receives the output of amplifier 46; whereas, the input A receives the output of amplifier 44. The small circle at the terminal indicates that a negative transition signal is required for activation. The clipped signals from comparator 50 are applied to a single-shot 48 which acts to square the signals in a manner so that the bars and spaces of the coded label are a properly shaped and measured pulse train. This pulse train contains high and low signals of a duration which equate to bars and spaces of the label being decoded.

When a label 9 located on the large container 7 passes the photo-eye 32, it becomes blocked in view of its height. A negative going transition signal is generated which is applied to the R terminal of flip-flop 34. This L signal re-sets flip-flop 34 and causes $\bar{Q}$ to become H. The H signal applied to inputs X,Y causes an input from resistor 38 to be applied to the B terminal of analog switch 36. The output C is applied to invertor 42 which activates comparator 50 and single-shot 48 in the manner previously described. The only difference is that the reflected signal from the label 9 will be of a large amplitude and, therefore, the application of the signal from resistor 38 causes a high threshold signal to be applied to comparator 50. This high threshold clips the differentiated signal that originates as input data applied to amplifier 33 and produces a pulse train of high and low signals of proper duration which equate to bars and spaces. Therefore, it should be evident that the system disclosed is able to accommodate low and high amplitude signals that are reflected from scanned labels attached to respective small and large containers.

The present invention also provides a capability for successfully scanning bar coded labels where the printing of the code is defective in that the ink is lightly deposited with respect to the bar elements. This results in a low contrast label for scanning. When this problem occurs the amplitude of the reflected analog signal from the label is not sufficiently large, and therefore inadequate signal is obtained for decoding. Circuitry has been provided in FIG. 2 which obviates this deficiency and is referred herein as alternating threshold switching. This circuitry is initiated by a photocell 15 in the form of a diode which is located in proximity to the mirror 13 (see FIG. 1) and receives the scanning beam emanating from the laser 10 after being reflected off the polygon 11. The diode is referred to herein as a prescan diode since its proximity herein to mirror 13 is prior to it being applied to the labels 9, 9a on respective containers 7,7a. The photocell 15 is further defined as a silicon solar cell which generates a voltage proportional to the amount of light that is detected from the rotating polygon 11. Hence, if the laser 10 and its output beam 12 were to deteriorate over time, the output of photocell 15 would similarly deteriorate.

As the reflective polygon 11 rotates the laser beam develops successive scan lines. These scan lines will eventually impinge upon the prescan diode 15. Therefore, each scan develops a positive voltage as the beam strikes the pre-scan diode 15. This signal is directed into operational amplifier 31, which operates as an invertor providing a second input signal where a ground signal is the first input signal. The output of amplifier 31 consisting of a series of pulses is directed into operational amplifier 35 which acts as a comparator and whose output is connected to the clock terminal C of a dual D flip-flop 37. The $\bar{Q}$ output of the flip-flop 37 is connected to the input D and causes flip-flop 37 to toggle with each pulse that is generated off facet 20, for example, of polygon 11 (see FIG. 1). Flip-flop 37 operates by feeding back the state of output $\bar{Q}$ and, at the first positive pulse at the clock terminal, the same state appears at output Q and the opposite state at terminal $\bar{Q}$. Thus, when $\bar{Q}$ is positive D is also positive. Therefore, when the flip-flop 37 is activated by a positive pulse initiated by the scan diode 15, signal action causes output Q to be positive and $\bar{Q}$ to become negative. Upon the next diode generated signal which emanated from facet 21 of the rotating polygon 11, the $\bar{Q}$ output will reverse in polarity from that above described.

The alternating positive and negative pulses from the $\bar{Q}$ output of dual D flip-flop 34 is applied through a closed switch SW2 to the analog switch 36 in the manner previously described with respect to the output $\bar{Q}$ from the J-K flip-flop 34. However, when SW2 is closed switch SW1 is open since the system must operate in one mode or alternatively in a second mode as determined by the condition of the switches. The alternating threshold signal operates in the manner previously described with respect to the mode where a container is being scanned at a distance from or close to the optics. As above described, by alternating the resistances 38,40 and the inputs X,Y to switch 36 a strong or weak reflected signal from high and low contrast labels can be successfully accommodated. In other words, when a low contrast label is being scanned the resulting low amplitude signal is handled by the circuitry of FIG. 2 as if a label 9a on container 7a were being scanned; on the other hand, when a high contrast label is being scanned, it is similar to the operation where label 9 on container 7 is being scanned. The only departure from the operation of mode one and two is that in the latter mode the alternating threshold or facet generating pulses are consecutive and uninterrupted, whereas the pulses produced by the detection of large and small containers are intermittent.

Therefore the alternating threshold feature of the invention in combination with the selection of the input signal to analog switch 36 assures that a low contrast label will have a high probability of being successfully scanned, since during the period that multiple scans are being applied to the label one-half of the pulses from flip-flop 37 will be L. The L pulses will condition analog switch 36, comparator 50 and multivibrator 48 to read the low and high contrast label properly.

Another aspect of the circuitry of FIG. 1 is that the functioning of the prescan diode 15 is always present in both modes of operation, and irrespective of whether switches SW1 and SW2 are open or closed. As previously mentioned, the output of the prescan diode 15 is directed into operational amplifier 31 whose output is transferred to operational amplifier 47. The output of amplifier 47 is applied to resistors 38,40 and sets the base threshold level of the variable resistor circuit. Hence, if the output level of the laser 10 were to diminish, the diminution would be sensed by the prescan diode 15. This signal alteration is transferred to the variable resistor circuit 38,40 so that, in effect, the circuitry involved in switching and comparing continues to be fully operational despite the laser output deterioration. This is a significant feature of the circuitry in FIG. 2 since it allows the system to track the output of the laser 10 and to make automatic changes when necessary.

While I have illustrated and described the preferred embodiments of my invention, it is to be understood that these are capable of variations and modifications, and I therefore do not wish to be limited to the precise changes and alterations as fall within the purview of the following claims.

What is claimed is:
1. Apparatus for reading a coded label comprising,
   a. a container wherein said label is mounted upon one of its surfaces, and said label containing information pertinent to said container;

b. means for scanning said coded label with a beam of light along an optical path to produce at least a first or, alternatively, a second reflected signal which is representative of information contained thereon;

c. said first reflected signal having a first magnitude, and said second reflective signal having a second magnitude which is less than said first magnitude, d. means for determining whether said container falls within a first range of sizes, or alternatively whether it falls within a second range of sizes;

e. means for receiving said reflected signals from said scanned label;

f. means coupled to said receiving means for adjusting said receiving means based upon whether said determining means has detected said first or second range of container sizes;

g. whereby a threshold level is provided for said receiving means based upon whether said first magnitude or said second magnitude signal is obtained from said scanned label such that the information obtained may be successfully interpreted.

2. An apparatus for reading a coded label in accordance with claim 1 wherein said means for determining sizes comprises, first and second photocells for generating respective first and second signals.

3. An apparatus in accordance with claim 2 wherein said adjusting means further comprises, means for accepting said first and second signals produced by said first and second photocells and said accepting means producing a third or alternatively, a fourth signal based upon the status of said photocells for applying to said adjusting means.

4. An apparatus in accordance with claim 3 wherein said means for accepting said first and second signals comprises, a flip-flop means.

5. An apparatus in accordance with claim 1 wherein said scanning means further comprises, optical means with a movable focusing means positioned along the optical path of said beam of light.

6. An apparatus in accordance with claim 5 and further comprising, a. means coupled to said optical means for altering its focal point upon receiving said third or alternatively said fourth signals, b. whereby said coded label can be successfully read with a properly focused beam of light whether said first or second range of container sizes is being scanned.

7. An apparatus in accordance with claim 6 wherein said means coupled to said optical means comprises, a negative lens and a positive lens wherein positive lens is movable and the negative lens is fixed in position, and said third or fourth signals causing said positive lens to be re-positioned with respect to said fixed negative lens to alter the focal point of said optical means for successfully scanning containers within said first and second range of sizes.

8. An apparatus in accordance with claim 3 and further comprising,

ON-OFF means connected between said accepting means and said adjusting means.

9. An apparatus in accordance with claim 8 and further comprising, a switching means connected to said ON-OFF means and to first and second variable resistor means which respectively produces fifth and sixth signals.

10. An apparatus in accordance with claim 9 and further comprising, a comparator means connected to an output of said switching means for coupling to said fifth and sixth signals.

11. An apparatus in accordance with claim 10 wherein said comparator means comprises first and second amplifiers connected to one another differentially.

12. An apparatus in accordance with claim 11 and further comprising, an invertor for receiving a signal from the output of said switching means, and an output of said invertor being connected to said first amplifier, the signal from said switching means also being directed into said second amplifier.

13. An apparatus in accordance with claim 12 and further comprising, a multivibrator means connected to the outputs of said first and second amplifiers to generate a data train representative of the information contained in said coded label.

14. An apparatus for reading a coded label imprinted with first, and alternatively, second contrasting symbols wherein said first symbol includes a different quality of printing than said second symbol comprising, a. a container wherein said label is mounted upon one of its surfaces, and said label providing information pertinent to said container, said container being dimensioned into first and second size ranges wherein said first range is larger than said second range container;

b. means for scanning said coded label with successive scan lines in a form of light beams;

c. means for receiving reflective signals from said label which is representative of information contained thereon by certain of said scanned lines, and the amplitude of said signals being greater for said first size container than the amplitude of said second size;

d. means coupled to and for adjusting said receiving means in a first mode based upon whether said first or second sized container is being scanned, and in an alternate second mode, continually providing an alternating threshold for adjusting said receiver means with each generated light beam;

e. said adjusting means providing a bias signal for said receiving means based upon the strength of the reflected signal that is obtained from said scanned label positioned upon said first and second size containers in said first mode, or alternatively, providing bias signals based upon the alternating threshold level that is obtained in said second mode for scanning labels having different quality printing, f. means coupled to said receiving means for generating a pulse train representative of the information contained in said coded label and relative to the bias signal applied to said receiver means whereby a successful interpretation may be obtained from said scanned label when said apparatus is operated in either mode.

15. An apparatus in accordance with claim 14 and further comprising, first and second switches for respectively selecting said first or second mode of operation.

16. The apparatus in accordance with claim 14 wherein said scanning means further comprising, optical means coupled to said receiving means for adjusting said last mentioned means once every time a scan line is generated to allow said symbols of different quality printing to be successfully scanned.

17. The apparatus in accordance with claim 16 wherein said optical means further comprises,
a photo detector means in the form of a pre-scan diode.

18. The apparatus in accordance with claim 17 wherein said means for adjusting comprises,
a. a toggling means having an input which is coupled to said photo detector means and an output which is coupled to said means for adjusting, and
b. whereby said pre-scan diode generates a signal with each scan which causes said toggling means to produce a train of signals which enables said apparatus to successfully read printed labels of varying quality.

19. The apparatus in accordance with claim 18 wherein said means for adjusting further comprising,
an analog switch having an input which is adapted to receive the output of said toggling means and, said switch further receiving input signals from either of two bias signals based upon whether said first or second size containers is being scanned.

20. The apparatus in accordance with claim 19 wherein said two signal sources comprise,
first and second variable resistors which are joined to one another in a circuit configuration.

21. The apparatus in accordance with claim 20 and further comprising,
a. means connected to said variable resistors for maintaining a base threshold level of said circuit configuration;
b. whereby the integrity of said apparatus is maintained when a deterioration of said scanning means occurs.

22. Apparatus for reading coded labels comprising,
a. first and second containers wherein one said coded label is placed on each said container, and said labels including information pertinent to said respective containers,
b. said first and second containers being characterized by different sizes wherein said first container is smaller than said second container;
c. means for scanning said coded label with a beam of light along an optical path to produce at least a first, or alternatively, a second reflective signal which are representative of information contained thereon, said first reflective signal having a first magnitude, and said second reflective signal having a second magnitude which is less than said first magnitude;
d. first and second optical means for respectively determining whether the label of said first or second container is being scanned and first means coupled to said optical means of producing first and second signals based upon said determination by said optical means;
e. means for receiving said reflected signals from said scanned labels;
f. second means coupled to and for adjusting said receiving means wherein said adjusting means is adapted to receive said first and second signals from said means, and said receiving means being adjusted to accommodate a reception of said first or, alternatively, said second magnitude signals; and
g. adjustable lens means contiguous to said scanning means;
h. third means coupled to said lens means and to said first means for adjusting said lens means defending on whether the coded label is located upon said first or alternatively, second container;
i. whereby said apparatus may successfully read the information located upon said coded label of different size containers with a properly focused beam of light.

23. Apparatus for reading a coded label comprising,
a. means for scanning said coded label with a beam of light along an optical path,
b. first and second detector means for respectively sensing differently sized containers, and producing respective first and second signals wherein said first signal is representative of a first sized container, said second signal being representative of said second sized container,
c. said first sized container being larger than said second sized container;
d. means coupled to said first and second detector means for receiving said respective first and second signals, and said coupled means producing first, or alternatively, second signals representative of whether said first or second sized containers have been sensed by said detector means;
e. lens means positioned along said optical path for adjusting the depth of field of said light means, and said adjusting means being adapted to receive said first and second signals emanating from said coupled means,
f. whereby said lens means is adjusted by said first signal to provide a depth of field for successfully reading the coded label on said first container, and alternatively, said lens means being adjusted by said second signal to provide a depth of field for successfully reading the coded label on said second container.

24. Apparatus in accordance with claim 23 wherein said lens means comprises,
a. a negative lens and a positive lens positioned along said optical path, and
b. said negative lens being fixed in place and said positive lens being movable from a fixed position,
c. whereby said relative movement between said positive and negative lens is adopted to double the depth of field thereof.

25. An apparatus for reading a coded label comprising,
a. a container wherein said label is mounted upon one of its surfaces, and said label containing information pertinent to said container;
b. said coded label being imprinted variously with first contrasting, or alternatively second contrasting information marking wherein said first markings are more visible than said second markings;
c. means scanning said differently contrasted labels with a repetitive beam of light along an optical path;
d. means in proximity to said beam for detecting repetitive beams of light;
e. first means coupled to said detecting means for generating a signal for every generated beam of light to form a series of pulses;

f. means for receiving said pulse series wherein the pulse train causes toggled signals to be produced;
g. means for receiving reflected signals from said scanned label that are representative of said information on said coded label;
h. second means coupled to and for adjusting said receiving means wherein said adjusting means is adapted to receive said toggled signals which continually adjust said receiving means with each generated beam of light;
i. means connected to said adjusted receiving means for producing a properly shaped and measured pulse train representative of said first, or alternatively, second contrasting coded labels;
j. whereby said apparatus can accommodate said coded labels with both more visible or less visible markings.

26. An apparatus in accordance with claim 25 and further comprising,
an ON-OFF switch located between said receiving means and said second means.

27. An apparatus in accordance with claim 25 wherein said means in proximity to said beam comprises a pre-scan diode means.

28. An apparatus for reading bar coded labels comprising,
a. first and second containers wherein one said coded label is placed on each container, and said labels including information pertinent to said respective containers,
b. said containers being characterized by different sizes wherein said first container is smaller than said second container, and
said labels being imprinted variously with first, or alternatively, second contrasting information markings wherein said first markings are more visible than said second markings;
c. means for generating multiple beams of coherent light for scanning said coded labels and producing reflected signals which are representative of the information contained thereon;
d. means positioned contiguously to said container for producing signals representative of whether said first or second container is being scanned;
e. means for receiving said reflected signals from said scanned labels;
f. means coupled to and for adjusting means based upon whether said first or second container is being scanned;
g. means for proximity to said coherent light for producing a signal for every generated beam of light;
h. means coupled to said proximity means for producing toggled signals via said produced signals;
i. a second switch means through which said toggled signals are applied to the adjusting means for providing alternating threshold switching of said adjusting means;
j. means connected to said receiving means for producing a properly shaped and measured pulse train representing the information on said coded labels;
k. second means coupled to said proximity means for generating a signal for setting a threshold level of said adjusting means;
l. whereby said threshold level is produced by said adjusting means to accommodate any deterioration of said means for generating said coherent light beams when said apparatus is operated in one mode by said first switch or in a second mode by said second switch, and said respective modes successfully interpreting information based upon whether different size containers are being scanned as well as coded label markings which are differently visible.

* * * * *